Figure 6:
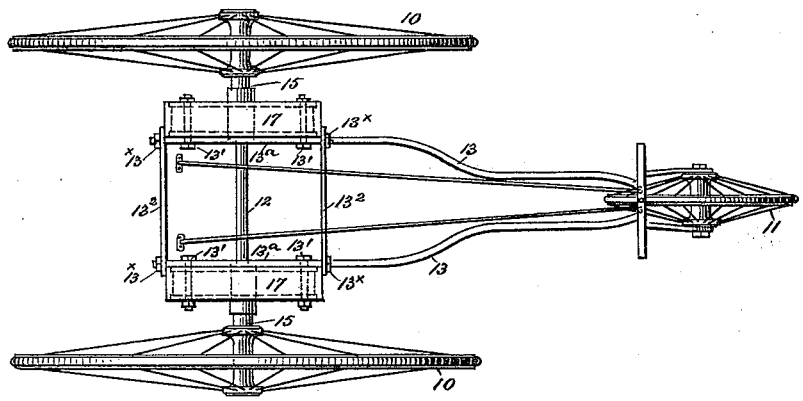

(No Model.) 2 Sheets—Sheet 1.
F. MARTIN.
VELOCIPEDE.
No. 440,954. Patented Nov. 18, 1890.
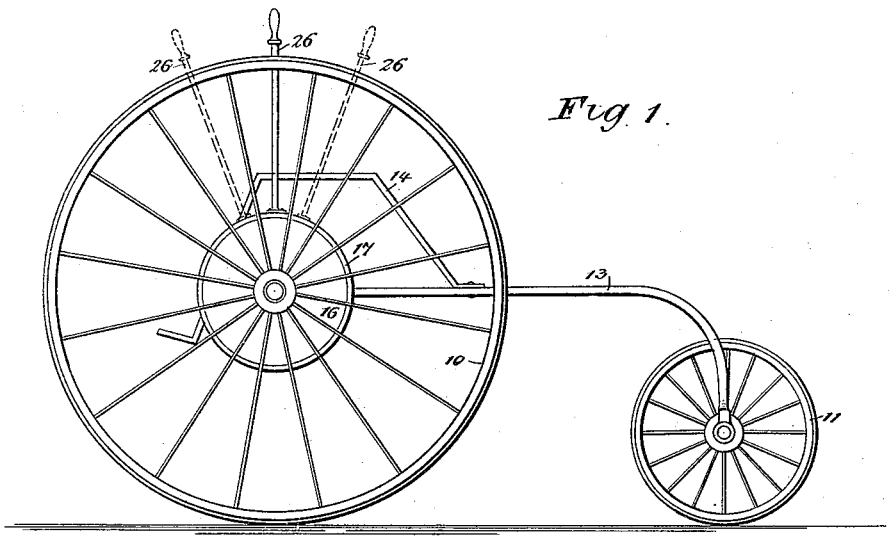
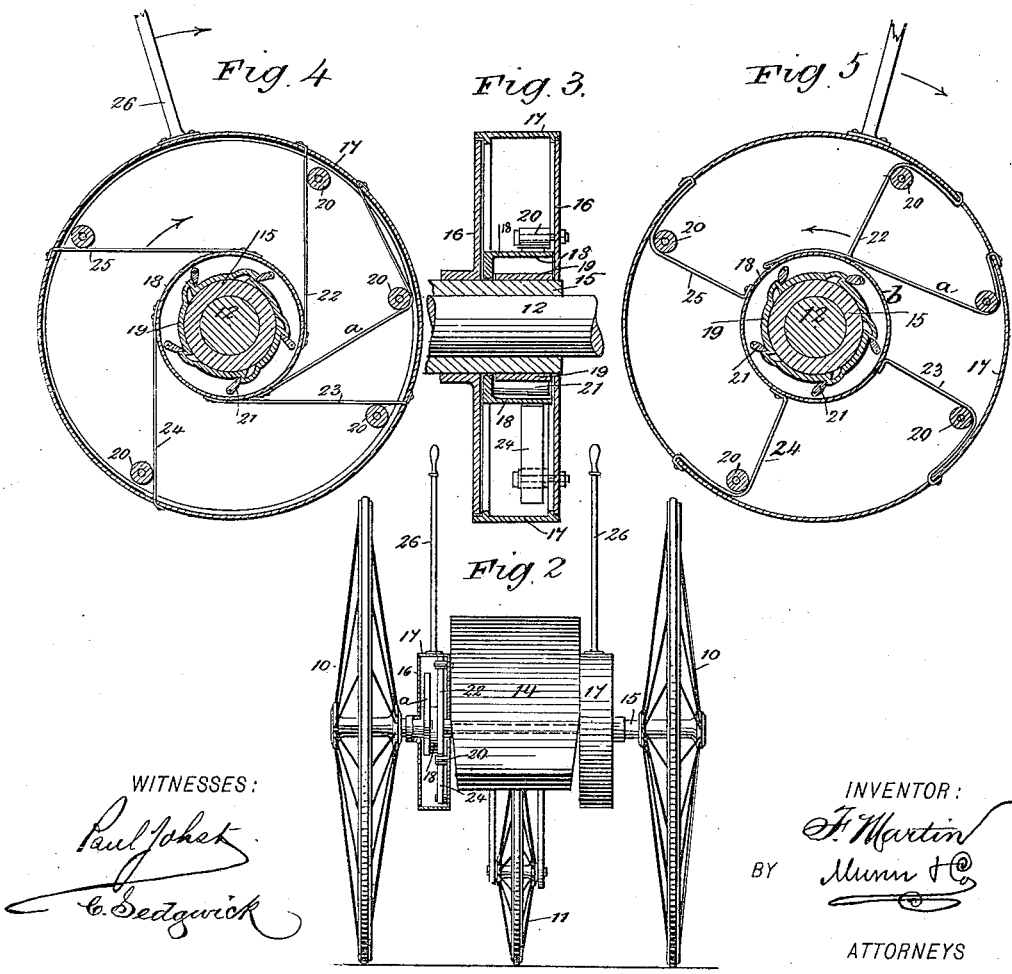
WITNESSES:
Paul Johst
C. Sedgwick
INVENTOR:
F. Martin
BY Munn & Co.
ATTORNEYS (No Model.) 2 Sheets—Sheet 2.

F. MARTIN.
VELOCIPEDE.

No. 440,954. Patented Nov. 18, 1890.

WITNESSES:
Paul Jahot
C. Sedgwick

INVENTOR:
F. Martin
BY
Munn & Co.
ATTORNEYS

UNITED STATES PATENT OFFICE.

FRANK MARTIN, OF SALT LAKE CITY, UTAH TERRITORY.

VELOCIPEDE.

SPECIFICATION forming part of Letters Patent No. 440,954, dated November 18, 1890.

Application filed April 7, 1890. Serial No. 346,932. (No model.)

*To all whom it may concern:*

Be it known that I, FRANK MARTIN, of Fort Douglas, Salt Lake City, in the county of Salt Lake and Territory of Utah, have invented a new and useful Improvement in Velocipedes, of which the following is a full, clear, and exact description.

My invention relates to an improvement in velocipedes, and has for its object to simplify the construction of the same and provide a means whereby the machine may be propelled with great speed and a minimum outlay of power; and a further object of the invention is to so construct the driving mechanism that it will be extremely simple in construction and positive in operation.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of a velocipede provided with my improved driving mechanism. Fig. 2 is a front elevation of the same, partly in section. Fig. 3 is a vertical section through a portion of the hub of the wheel and the driving mechanism attached thereto. Fig. 4 is a section taken through the driving mechanism at a right angle to the section shown in Fig. 3, illustrating the position of the parts at the termination of the forward stroke of the attached lever; and Fig. 5 is a similar view illustrating the position of the parts at the termination of the rear stroke of the said lever upon which stroke the driving mechanism is set in motion. Fig. 6 is a plan of the machine with the seat removed, showing how the casings 16 are secured to the backbone 13.

The velocipede is preferably provided with three wheels—namely, two large front wheels 10 and a smaller rear wheel 11—the two front wheels being adapted to turn upon the same axle 12, and upon the said axle, and likewise the backbone 13, the seat 14 is located. Upon the hub 15 of each wheel 10 two spaced disk-like plates 16 are attached, and upon the periphery of the said plates a collar 17 is held to slide, which collar covers the space intervening the plates, as illustrated in Fig. 3. The rear ends or extensions $13^a$ of the backbone 13 extend across the adjacent faces of the two inner disks 16, and bolts 13' pass through each pair of disks and secure them firmly to said rear ends. The rear ends of the backbone 13 in front and rear of the collars 17 are connected by cross-bars $13^2$ and securing nuts or collars $13^\times$, as shown clearly in Fig 6.

Between the plates 16 a box-collar 18 is loosely mounted upon the hub of the wheel, and within said collar a toothed or ratchet casting 19 is firmly attached to the outer peripheral face of the hub, as illustrated in Figs. 4 and 5, and between the periphery of the plates and the outer peripheral surface of the box-collar a series of spaced friction-rollers 20 is placed between the plates, as is best illustrated in Fig. 3. In one side surface of the box-collar 18 a series of pawls 21 is pivoted, which pawls are adapted to engage with the ratchet-casting 19 of the hub. To the exterior peripheral surface of the box-collar one end of straps 22, 23, 24, and 25 are secured at suitable intervals apart, which straps are carried outward in contact with the friction-rollers 20, and are secured to the sliding collar 17. The straps 22, 22, 24, and 25 are brought into operation upon the back-stroke of a lever 26, attached to the outer surface of the collar and adapted to extend upward within convenient reach of the rider's seat. Another strap $a$, which is the return-strap, is also attached to the outer peripheral surface of the box-collar, and is made to contact with a friction-roller upon the side opposite that with which the other straps contact with their rollers, and the outer end of the return-strap $a$ is likewise secured to the sliding collar 17.

As heretofore stated, two boxes containing the driving mechanism are employed—one located at each side of the rider's seat—and each box is identical in construction and provided with an attached lever 26. Both levers 26 are carried in the same direction in operation, and when the said levers have been carried forward the collar 17 is revolved in the direction of the front of the machine, whereby tension is exerted upon the return-strap $a$ and the box-collar is revolved in the opposite direction, causing the pawls 21 to slip over the teeth of the ratchet-casting, and when the levers have been carried to their farthest front position or to the end of the forward stroke the position of the parts is as illustrated in Fig. 4. Upon the return-stroke the drive-wheels are revolved, and this is accomplished in the following manner: As the collar 17 is rotated in the direction of the rear, as indicated by the arrow in Fig. 5, the box-collar is made to turn in the direction of the front of the machine by reason of tension being exerted upon the straps 22, 23, 24, and 25, and the pawls are made to contact thereby with the ratchet-casting of the hubs and the wheels 10 forced to revolve. In the rear-propelling movement of the levers 26 the strap 22 will have moved from a position approximately at $b$ in Fig. 5, which is substantially the position it occupies in Fig. 4, to the position in which it is shown as located in said Fig. 5, and the other straps will have moved exactly the same distance, and by this revolution of the box-collar the return-strap $a$ will be slightly wound upon the said collar, whereupon as the lever is carried forward upon the recover-stroke the said box-collar is rotated in the direction of the rear and the pawls take the position for the next back or power stroke.

Having thus described my invention, I claim as new and desire to secure by Letters Patent—

1. In a velocipede or similar machine, the combination, with the drive-wheels thereof, and a ratchet-casting secured to the wheels, of a casing having an open peripheral surface secured to the wheels around the ratchet-casting, a collar held to slide upon the periphery of the casing and closing the same, a lever attached to said collar, a box-collar loosely mounted within the casing upon the wheel over the ratchet-casting, pawls secured to the box-collar and adapted for engagement with the ratchet, and a strap-connection between the box-collar and the outer sliding collar, substantially as shown and described, and for the purpose specified.

2. In a velocipede or similar machine, the combination, with the driving-wheels thereof and a ratchet-casting secured to the said wheels, of a casing having an open peripheral surface secured to the wheels around the ratchet-casting, a collar held to slide upon the periphery of the casing and closing the same, a lever attached to said collar, a box-collar loosely mounted within the casing upon the wheel over the ratchet-casting, pawls secured to the box-collar and adapted for engagement with the ratchet, friction-rollers journaled within the casing, and propelling-straps and a return-strap secured at their inner ends to the outer peripheral surface of the box-collar and contacting with the friction-rollers of the casing, the outer ends of the said straps being attached to the sliding collar, substantially as shown and described, and for the purpose specified.

FRANK MARTIN.

Witnesses:
JNO. W. GREENMAN,
HENRY D. STYER.